US008073476B2

(12) United States Patent
Deng et al.

(10) Patent No.: US 8,073,476 B2
(45) Date of Patent: Dec. 6, 2011

(54) MOBILE COMMUNICATION DEVICE AND METHOD FOR DELETING SHORT MESSAGE SERVICE MESSAGES

(75) Inventors: Yong-Jun Deng, Shenzhen (CN); De-Zhi Li, Shenzhen (CN); Shih-Fang Wong, Taipei Hsien (TW)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 1010 days.

(21) Appl. No.: 11/967,118

(22) Filed: Dec. 29, 2007

(65) Prior Publication Data

US 2008/0305814 A1    Dec. 11, 2008

(30) Foreign Application Priority Data

Jun. 8, 2007 (CN) .......................... 2007 1 0200800

(51) Int. Cl.
*H04W 4/00* (2009.01)
(52) U.S. Cl. .................. 455/466; 455/412.1; 455/415; 455/410; 455/550.1
(58) Field of Classification Search .................. 455/466, 455/412.1, 412.2, 410, 550.1
See application file for complete search history.

(56) References Cited

U.S. PATENT DOCUMENTS

| 4,630,108 | A | * | 12/1986 | Gomersall | 725/34 |
| 4,805,209 | A | * | 2/1989 | Baker et al. | 379/93.23 |
| 7,164,928 | B2 | * | 1/2007 | Ding et al. | 455/466 |
| 7,254,410 | B2 | | 8/2007 | Park | |
| 7,586,855 | B1 | * | 9/2009 | Yellai et al. | 370/255 |
| 2002/0193128 | A1 | * | 12/2002 | Park | 455/466 |
| 2004/0153431 | A1 | * | 8/2004 | Bhogal et al. | 707/1 |
| 2006/0041622 | A1 | | 2/2006 | Qutub et al. | |
| 2006/0135190 | A1 | * | 6/2006 | Drouet et al. | 455/514 |
| 2006/0148496 | A1 | * | 7/2006 | Zhu et al. | 455/466 |
| 2006/0168031 | A1 | | 7/2006 | Cai et al. | |

FOREIGN PATENT DOCUMENTS

| CN | 1114125 A | 12/1995 |
| CN | 1391421 A | 1/2003 |
| CN | 1937806 A | 3/2007 |
| WO | 9506996 | 3/1995 |

OTHER PUBLICATIONS

3GPP, TR 22.868 V8.0.0, Mar. 2007, 3GPP.*

* cited by examiner

*Primary Examiner* — Vladimir Magloire
(74) *Attorney, Agent, or Firm* — Altis Law Group, Inc.

(57) ABSTRACT

A mobile communication device includes a receiver, a detector, an analyzer, and a deleting module. The receiver is used for receiving short message service messages, and storing the short message service messages in a message record. The detector is used for detecting an occupying space of the short message service messages, and generating a signal if the occupying space is greater than a predetermined volume. The analyzer is used for storing a plurality of message deletion rates of short message service messages and a deletion time, and generating a delete command according to the signal and the message deletion rates or to the signal and the deletion time. The deleting module is used for receiving the delete command, and deleting pending short message service messages according to the delete command. A method for automatically deleting short message service messages from the mobile communication device is also provided.

6 Claims, 6 Drawing Sheets

| Unique serial number (2 bytes) | MDN (20 bytes) | Time (12 bytes) | Read flag (1 byte) | Content (160 bytes) | Other information |

FIG. 2

| Unique serial number (2 bytes) | MDN (20 bytes) | Time (12 bytes) | Read flag (1 byte) | Save flag (1 byte) | Content (160 bytes) | Other information |
|---|---|---|---|---|---|---|

FIG. 4

MOBILE COMMUNICATION DEVICE AND METHOD FOR DELETING SHORT MESSAGE SERVICE MESSAGES

BACKGROUND

1. Field of the Invention

The present invention generally relates to mobile communication devices and methods, and more particularly, to a mobile communication device and a method for automatically deleting short message service (SMS) messages.

2. Description of Related Art

Mobile communication devices, such as mobile phones, personal digital assistants (PDA), notebook computers, and so on, are now equipped to transmit and receive text messages, such as short message service (SMS) messages. SMS is a popular and convenient service available on most mobile communication devices that permits the sending of short messages between mobile communication devices. SMS was originally designed as part of the global system for mobile communications (GSM) digital mobile phone standard, but is now available on a wide range of networks, including third generation (3G) networks.

However, as the popularity of the mobile communication devices continue to grow, SMS messaging is widely used as a retail advertising medium. Actually, some available SMS services offer automated messages sent on a regular basis giving news, weather, financial information, sporting event scores, and other information. As such, in a short interval, SMS subscribers may find their mobile communication devices full of expired or spam SMS messages. Therefore, they need to delete these unwanted messages themselves, so it is inconvenient.

Therefore, improvements for a mobile communication device and a method for automatically deleting SMS messages are needed in the industry to address the aforementioned deficiency.

SUMMARY

A mobile communication device includes a receiver, a detector, an analyzer, and a deleting module. The receiver is used for receiving short message service messages, and storing the short message service messages in a message record. The detector is used for detecting an occupying space of the short message service messages, and generating a signal if the occupying space is greater than a predetermined volume. The analyzer is used for storing a plurality of message deletion rates of short message service messages and a deletion time, and generating a delete command according to the signal and the message deletion rates or to the signal and the deletion time. The deleting module is used for receiving the delete command, and deleting pending short message service messages according to the delete command. A method for automatically deleting short message service messages from the mobile communication device is also provided.

Other advantages and novel features of the present invention will become more apparent from the following detailed description of preferred embodiment when taken in conjunction with the accompanying drawings.

BRIEF DESCRIPTION OF THE DRAWINGS

FIG. 2 is a schematic diagram showing a message record of one short message service message stored in the mobile communication device of FIG. 1.

FIG. 4 is a schematic diagram showing a message record of one short message service message in accordance with a second exemplary embodiment.

DETAILED DESCRIPTION OF THE EMBODIMENTS

Reference will now be made to the drawings to describe a preferred embodiment of the present mobile communication device and a preferred embodiment of the present method.

Figure 1:
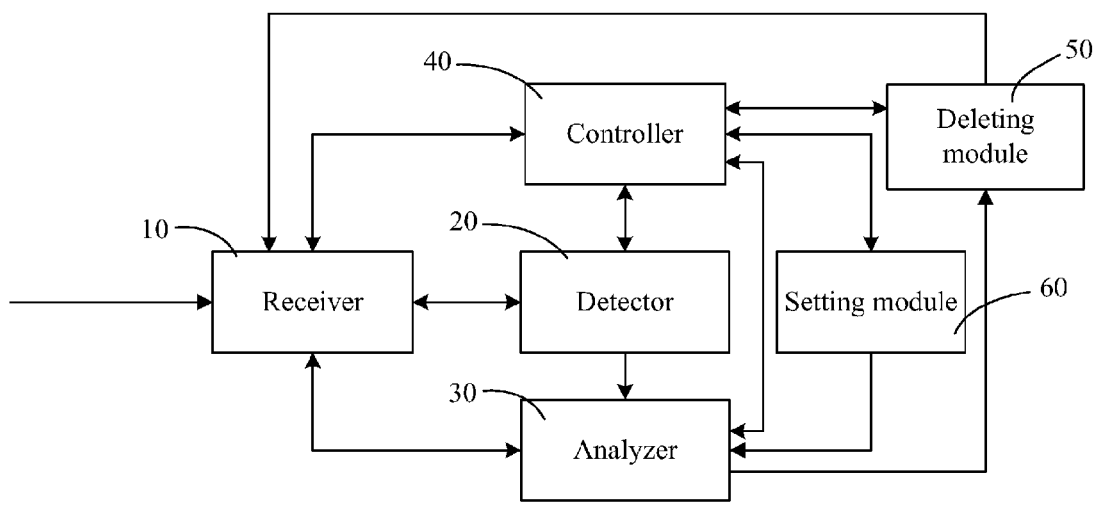
FIG. 1 is a schematic diagram showing a mobile communication device in accordance with a first exemplary embodiment.

Referring to FIG. 1, a mobile communication device 100 in accordance with a first exemplary embodiment is configured for transmitting and receiving short message service (SMS) messages, and to automatically delete unwanted SMS messages. The mobile communication device 100 includes a receiver 10, a detector 20, an analyzer 30, a controller 40, a deleting module 50, and a setting module 60.

The receiver 10 is used for receiving SMS messages and storing them as a message record. In the embodiment, referring to FIG. 2, the message record of one SMS message includes a unique serial number, mobile directory number (MDN), time, a read flag, content, and other information. The MDN is a phone number of a mobile phone. Two bytes are allocated for the unique serial number; twenty bytes are allocated for the MDN; twelve bytes are allocated for the time; one byte is allocated for the read flag; one hundred and sixty bytes are allocated for the content, and still a number of bytes are allocated for the other information. In other embodiments, the message record may include other information except for the above mentioned information. Furthermore, the information of the other embodiments can be allocated with suitable amount of bytes.

The detector 20 is used for detecting an occupying space of the SMS messages stored in the receiver 10. If the occupying space is greater than a predetermined volume of the receiver 10, the detector 20 sends a signal to the analyzer 30.

The analyzer 30 is used for storing a plurality of message deletion rates of each of the SMS messages and a deletion time, and generating a delete command according to the signal and the message deletion rates or to the signal and the deletion time. Actually, if the analyzer 30 receives the signal, the analyzer 30 selects certain SMS messages as pending SMS messages according to the message deletion rates and generates the delete command to the deleting module 50. If the SMS messages all have a same message deletion rate, the analyzer 30 selects the pending SMS messages according to the deletion time.

The controller 40 is used for controlling other components of the mobile communication device 100 to work. The deleting module 50 is used for receiving the delete command, and deleting the pending SMS messages according to the delete command.

The setting module 60 is used for receiving users' inputs and setting the message deletion rates of the SMS messages. In practice, the message deletion rates can be set to several levels according user preferences. In the embodiment, the message deletion rates are have three different rates: a high level that indicates that the SMS message is a spam SMS message where the MDN of the spam SMS message cannot be found in contact list (phone book) of the mobile communication, that is, the MDN (phone number) of the spam SMS message is not stored in the mobile communication device 100 and from an unknown source; a mid level indicates that the SMS message is a read SMS message that have been displayed; a low level indicates that the SMS message is an ordinary SMS message that has not been read/displayed. Moreover, the deletion time can also be configured through the setting module 60.

When operating, the detector 20 detects the occupying space of the SMS messages, and sends the signal to the analyzer 30 if the occupying space is greater than the predetermined volume. The analyzer 30 receives the signals, and generates the delete command according to the signal and the message deletion rates. The deleting module 50 receives the delete command and deletes corresponding SMS messages.

In detail, the analyzer 30 first searches for first pending SMS messages with the high level message deletion rates, i.e. whose MDNs can not be found in the mobile directory (not shown). If the first pending SMS messages are found, the deleting module 50 receives the delete command and deletes the first pending SMS messages from the receiver 10.

If the first pending SMS messages cannot be found, the analyzer 30 searches for the second pending SMS messages with the mid level message deletion rates. If the second pending SMS messages are found, the deleting module 50 receives the delete command and deletes the second pending SMS messages from the receiver 10.

If the second pending SMS messages are not found, the analyzer 30 searches for third pending SMS messages in the ordinary SMS messages with the low level message deletion rates according to the deletion time, and generates the delete command. The deleting module 50 receives the delete command and deletes the third pending SMS messages from the receiver 10.

As mentioned above, the mobile communication device 100 can automatically delete SMS messages according to the preset message deletion rates and the preset deletion time. Therefore, the SMS messages no longer have to be deleted manually.

Figure 3:
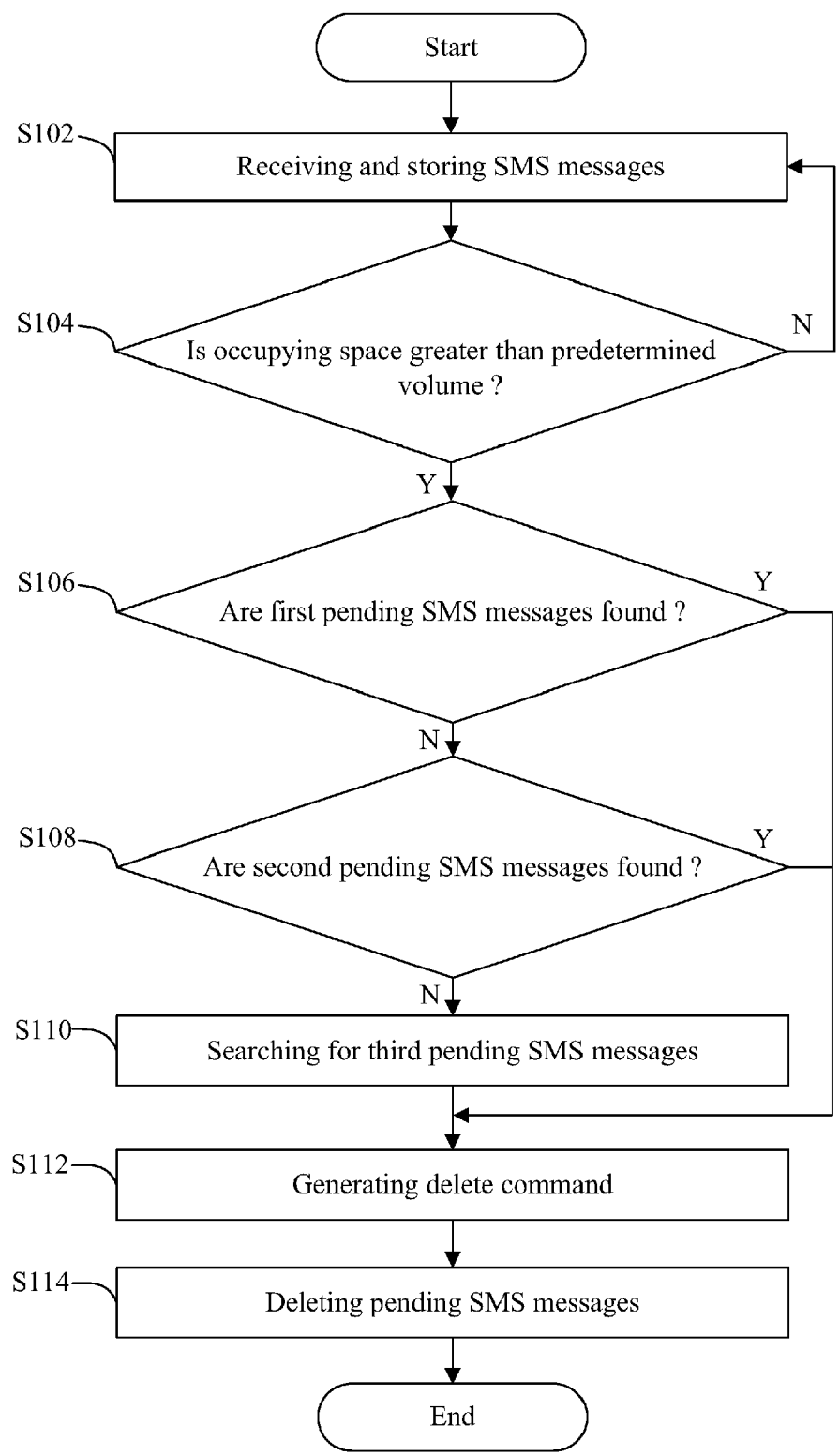
FIG. 3 is a process flow diagram illustrating a method in accordance with a first exemplary embodiment for automatically deleting short message service messages from the mobile communication device of FIG. 1.

Referring to FIG. 3, a method is used for automatically deleting SMS messages from the mobile communication device 100 in accordance with a first exemplary embodiment. A procedure of the method includes the following steps.

Step S102, the receiver 10 receives and stores the SMS messages.

Step S104, the detector 20 detects the occupying space of the SMS messages. If the occupying space is not greater than the predetermined volume, the procedure goes to step S102. If the occupying space is greater than the predetermined volume, the procedure goes to step S106.

Step S106, the analyzer 30 searches for the first pending SMS messages with the high level message deletion rates. If the first pending SMS messages are not found, the procedure goes to step S108. If the first pending SMS messages are found, the procedure goes to step S112.

Step S108, the analyzer 30 searches for the second pending SMS messages with the mid level message deletion rates. If the second pending SMS messages are not found, the procedure goes to step S110. If the second pending SMS messages are found, the procedure goes to step S112.

Step S110, the analyzer 30 searches for the third pending SMS messages with the low level message deletion rates according to the deletion time.

Step S112, the analyzer 30 generates the delete command according to the first, or the second, or the third pending SMS messages.

Step S114, the deleting module 50 receives the delete command and deletes the first, or the second, or the third pending SMS messages.

Referring to FIG. 4, in order to protect some special SMS messages from being deleted, such as some SMS messages which were read and have been kept for a long time, the message record of one SMS message in accordance with a second embodiment can include a save flag allocated with one byte. The controller 40 can identify the save flag by detecting its value, and distinguish the SMS message that has the save flag from other SMS messages. A default value of a save flag of each SMS message stored in its corresponding message record is "0". If a SMS message is determined to be kept as a special SMS message by users, the users need to set a value "1" to a save flag of the SMS message using the setting module 60. Therefore, values of save flags of the normal SMS messages are "0", and values of save flags of the special SMS messages are "1".

Figure 5:
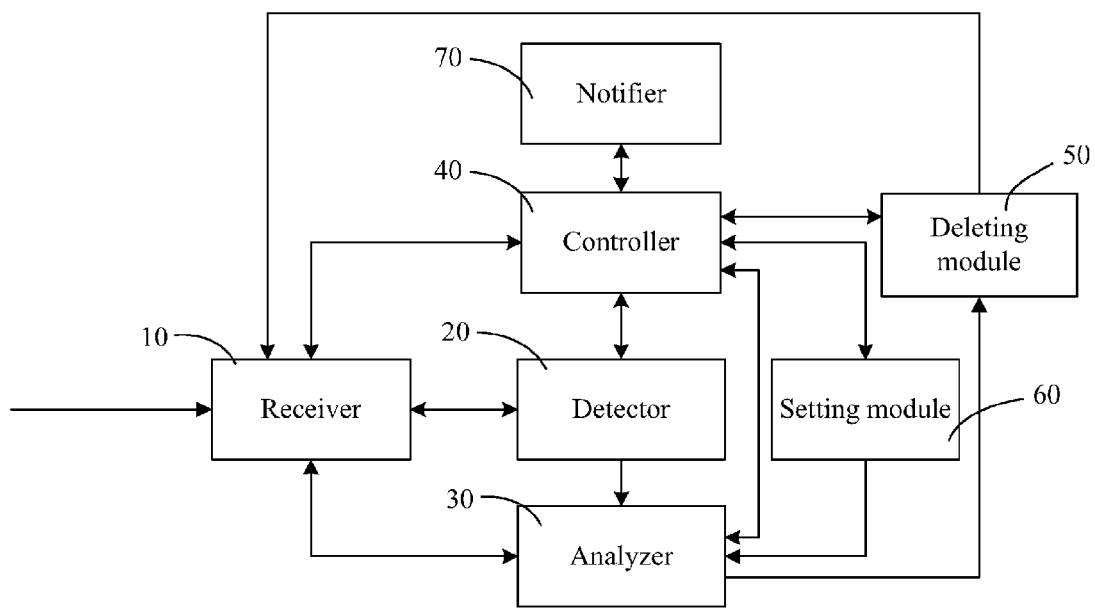
FIG. 5 is a schematic diagram showing the mobile communication device in accordance with a second exemplary embodiment, storing short message service message with the message record of FIG. 4.

Referring to FIG. 5, a mobile communication device 200 in accordance with a second exemplary embodiment is used for automatically deleting SMS messages and protecting the special SMS messages mentioned above. In contrast with the mobile communication device 100 in accordance with the first embodiment, a notifier 70 is added in the mobile communication device 200. The notifier 70 is controlled by the controller 40 to require a user input to delete the special SMS messages. The deleting module 50 deletes the special SMS messages if the user input is received, otherwise the deleting module 50 jumps over the special SMS messages. Furthermore, a wait time is set by the users using the setting module 60, and the deleting module 50 jumps over the special SMS messages if the user input is not received when the wait time has been past.

Figure 6:
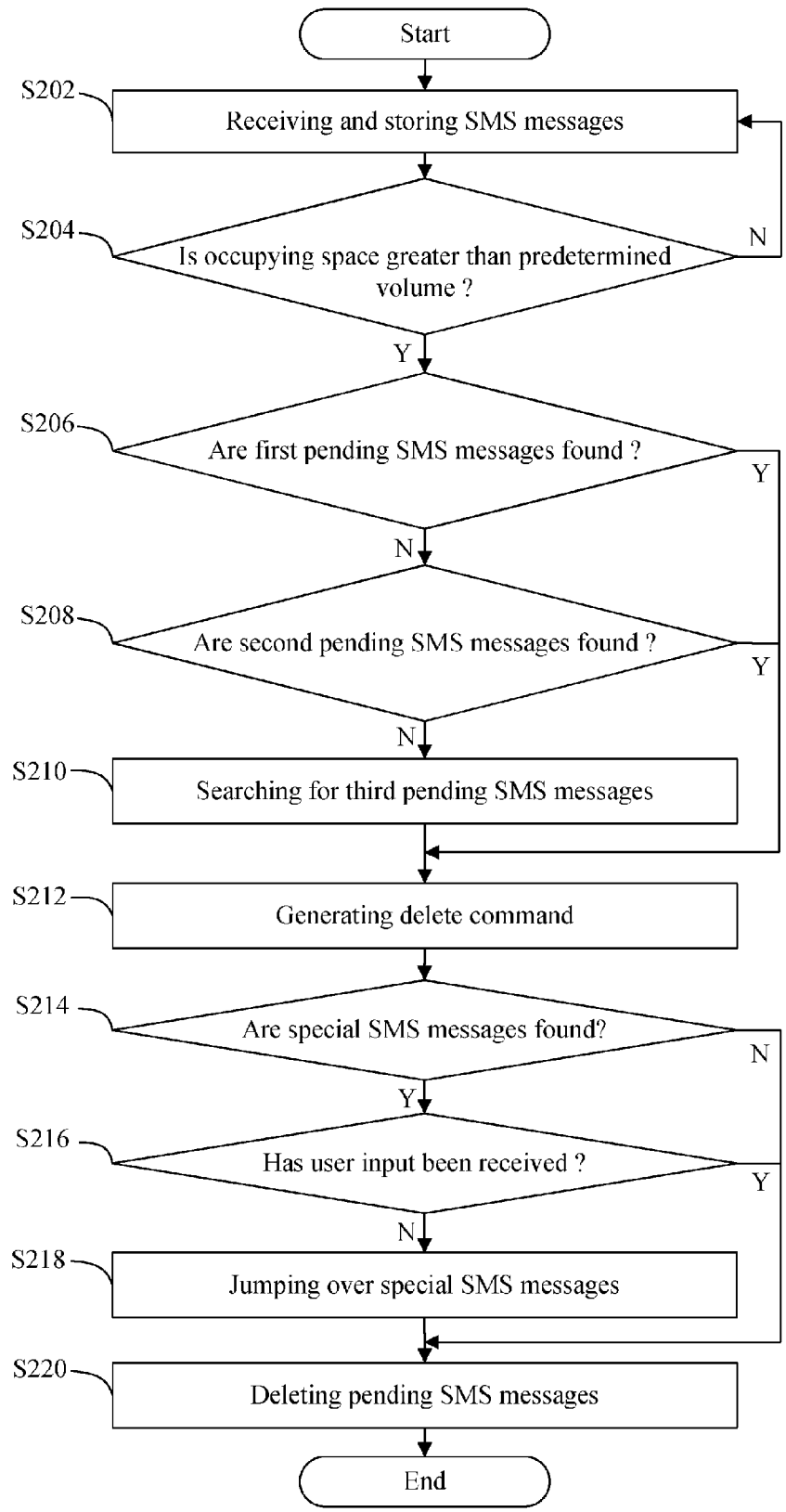
FIG. 6 is a process flow diagram illustrating a method in accordance with a second exemplary embodiment for automatically deleting short message service messages from the mobile communication device of FIG. 5.

Referring to FIG. 6, a method is used for automatically deleting SMS messages from the mobile communication device 100 protect the special SMS messages mentioned above in accordance with a second embodiment. A procedure of the method includes the following steps.

Step S202, the receiver 10 receives and stores the SMS messages.

Step S204, the detector 20 detects the occupying space of the SMS messages. If the occupying space is not greater than the predetermined volume, the procedure goes to step S202. If the occupying space is greater than the predetermined volume, the procedure goes to step S206.

Step S206, the analyzer 30 searches for the first pending SMS messages with the high level message deletion rates. If the first pending SMS messages are not found, the procedure goes to step S208. If the first pending SMS messages are found, the procedure goes to step S212.

Step S208, the analyzer 30 searches for the second pending SMS messages with the mid level message deletion rates. If the second pending SMS messages are not found, the procedure goes to step S210. If the second pending SMS messages are found, the procedure goes to step S212.

Step S210, the analyzer 30 searches for the third pending SMS messages with the low level message deletion rates according to the deletion time.

Step S212, the analyzer 30 generates the delete command according to the first, or the second, or the third pending SMS messages.

Step S214, the controller 40 identifies the first, or the second, or the third pending SMS messages to find the special SMS messages. If the special SMS messages are found, the procedure goes to step S216. If the special SMS messages are not found, the procedure goes to step S220.

Step S216, the notifier 70 requires a user input in the wait time. If the user input has not been received in the wait time, the procedure goes to step S218. If the user input has been received in the wait time, the procedure goes to step S220.

Step S218, the deleting module jumps over the special SMS messages, and deletes the first, or the second, or the third pending SMS messages except for the special SMS messages.

Step S220, the deleting module 50 receives the delete command and deletes the first, or the second, or the third pending SMS messages.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A method for automatically deleting short message service messages comprising:
   receiving and storing short message service messages;
   detecting an occupying space of the short message service messages;
   searching for first pending short message service messages with high level message deletion rates if the occupying space is greater than a predetermined volume;
   generating a first delete command according to the first pending short message service messages if the first pending short message service messages are found;
   receiving the first delete command;
   deleting the first pending short message service messages according to the first delete command;
   searching for a second pending short message service messages with a mid level message deletion rates if the first pending short message service messages are not found;
   generating a second delete command according to the second pending short message service messages if the second pending short message service messages are found;
   receiving the second delete command;
   deleting the second pending short message service messages according to the second delete command;
   wherein the high level message deletion rate indicates spam short message service messages, and a mid level message deletion rate indicates read short message service messages.

2. The method according to claim 1, further comprising:
   repeating "receiving and storing short message service messages" if the occupying space is not greater than a predetermined volume.

3. The method according to claim 1, further comprising:
   searching for a third pending short message service messages with a low level message deletion rates if the second pending short message service messages are not found according to a deletion time;
   generating a third delete command according to the third pending short message service messages;
   receiving the third delete command;
   deleting the third pending short message service messages according to the third delete command.

4. The method according to claim 1, further comprising:
   identifying the first pending short message service messages to find special short message service messages;
   receiving the delete command if the special short message service messages are not found;
   deleting the first pending short message service messages.

5. The method according to claim 4, further comprising:
   requiring a user input if the special short message service messages are found;
   receiving the delete command if the user input has been received;
   deleting the first pending short message service messages.

6. The method according to claim 5, further comprising:
   jumping over the special short message service messages if the user input has been received;
   deleting the first pending short message service messages except for the special short message service messages.

* * * * *